United States Patent
Hinokio et al.

(10) Patent No.: US 9,248,787 B2
(45) Date of Patent: Feb. 2, 2016

(54) VEHICLE INTERIOR PART INCLUDING A CLIP MOUNT HAVING A PROTRUSION TO GUIDE A SEALING MEMBER

(71) Applicant: TOYOTA BOSHOKU KABUSHIKI KAISHA, Aichi-ken (JP)

(72) Inventors: Makoto Hinokio, Aichi-ken (JP); Bongkee Kim, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 14/221,378

(22) Filed: Mar. 21, 2014

(65) Prior Publication Data

US 2014/0300133 A1 Oct. 9, 2014

(30) Foreign Application Priority Data

Apr. 4, 2013 (JP) ................. 2013-078347

(51) Int. Cl.
*B60R 13/02* (2006.01)
*B60J 5/04* (2006.01)
*F16B 5/06* (2006.01)

(52) U.S. Cl.
CPC ........... *B60R 13/0243* (2013.01); *B60J 5/0413* (2013.01); *B60R 13/0206* (2013.01); *F16B 5/0657* (2013.01)

(58) Field of Classification Search
CPC ........... B29L 2031/3014; B60J 5/0412; B60J 5/0413; B60J 5/0416; B60J 5/0418; B60J 5/0468; B60R 13/02; B60R 13/0206; B60R 13/0237; B60R 13/0243; B60R 2013/0287; F16B 5/06; F16B 5/065; F16B 5/0657; Y10T 24/30; Y10T 24/309
See application file for complete search history.

(56) References Cited

U.S. PATENT DOCUMENTS

| | | | | | |
|---|---|---|---|---|---|
| 5,531,499 | A | * | 7/1996 | Vecchio | B60R 13/0206 188/377 |
| 5,820,191 | A | * | 10/1998 | Blakewood, Jr. | B60J 5/0413 296/146.7 |
| 5,992,914 | A | * | 11/1999 | Gotoh | B60R 13/0206 280/751 |
| 6,145,908 | A | * | 11/2000 | Deb | B60R 13/0206 280/751 |
| 6,196,607 | B1 | * | 3/2001 | Gulisano | B60R 13/01 293/115 |
| 7,513,528 | B2 | * | 4/2009 | Penner | B60R 7/06 280/752 |
| 7,972,204 | B2 | * | 7/2011 | Pupillo | B60J 10/0031 296/146.7 |

(Continued)

FOREIGN PATENT DOCUMENTS

| | | | | |
|---|---|---|---|---|
| DE | 10310652 B3 | * | 8/2004 | ............ B29C 33/005 |
| DE | 102013212320 A1 | * | 5/2014 | .......... B60R 13/0206 |

(Continued)

*Primary Examiner* — Glenn Dayoan
*Assistant Examiner* — Paul Chenevert
(74) *Attorney, Agent, or Firm* — Greenblum & Bernstein, P.L.C.

(57) ABSTRACT

A vehicle interior part includes a main wall portion, a flange portion, a clip mount base, a protrusion, and a sealing member. The clip mount base includes a projecting wall and a base. The projecting wall projects from an opposed surface of the flange portion away from a distal end of the flange portion. The base projects from a distal end of the projecting wall. The protrusion protrudes from the opposed surface between the projecting wall and the distal end of the flange portion and has a first height on a first side closer to the distal end of the flange portion and a second height on a second side closer to the clip mount base. The first height is greater than the second height. The sealing member is disposed on the opposed surface between the protrusion and the distal end of the flange portion.

16 Claims, 7 Drawing Sheets

(56) References Cited

U.S. PATENT DOCUMENTS

| | | | | |
|---|---|---|---|---|
| 8,801,075 B2* | 8/2014 | Torii | ...................... | B60J 5/0413 29/428 |
| 2006/0222841 A1* | 10/2006 | Masumizu | ........ | B29C 45/14336 428/319.3 |
| 2006/0265964 A1* | 11/2006 | Winborn | ................ | B60J 5/0468 49/502 |
| 2007/0024082 A1* | 2/2007 | Steelman | ............... | B60J 5/0418 296/146.1 |
| 2010/0225142 A1* | 9/2010 | Mazur | ................... | B60J 5/0468 296/146.7 |
| 2011/0089713 A1* | 4/2011 | Yamaguchi | ......... | B60R 21/0428 296/146.7 |
| 2012/0001446 A1* | 1/2012 | Vollet | ..................... | B60R 13/04 296/1.08 |
| 2013/0057009 A1* | 3/2013 | Turicik | ............... | B60R 13/0206 296/1.08 |
| 2013/0305653 A1* | 11/2013 | Ishizu | ............... | B29C 45/14336 52/718.01 |
| 2014/0284962 A1* | 9/2014 | Mally | ................... | F16B 5/0657 296/146.7 |

FOREIGN PATENT DOCUMENTS

| | | | | |
|---|---|---|---|---|
| EP | 2138355 A2 * | 12/2009 | .......... | B60R 13/0815 |
| FR | 2920114 A1 * | 2/2009 | ............. | B60J 5/0418 |
| JP | 2009-173197 A | 8/2009 | | |
| WO | WO 2013094655 A1 * | 6/2013 | ............. | B60J 5/0418 |
| WO | WO 2014024591 A1 * | 2/2014 | ............. | B60J 5/0418 |

\* cited by examiner

US 9,248,787 B2

VEHICLE INTERIOR PART INCLUDING A CLIP MOUNT HAVING A PROTRUSION TO GUIDE A SEALING MEMBER

CROSS REFERENCE TO RELATED APPLICATION

This application claims priority from Japanese Patent Application No. 2013-078347 filed on Apr. 4, 2013. The entire contents of the priority application are incorporated herein by reference.

TECHNICAL FIELD

The present disclosure relates to a vehicle interior part.

BACKGROUND

Vehicle interior parts that are attached to vehicle door panels with clips have been known. Examples of the vehicle interior parts include a vehicle door trim including clip mount bases on a back surface thereof and clips mounted to the clip mount bases. The clips are placed in mount holes that are through holes in a vehicle panel (inner panel) when the door trim is attached to the inner panel. The clip mount bases are formed integrally with a flange portion located at peripheral edge portions of the door trim. The clip mount bases are located close to the peripheral edges of the door trim. With this configuration, the peripheral edge portions of the door trim are properly fixed to the inner panel.

A sealing member may be disposed on the flange portion for sealing between the inner panel and the door trim. The sealing member is pressed between the flange portion and the inner panel. With this configuration, water or other foreign materials are less likely to enter between the flange portion and the inner panel. The clip mount bases are arranged on the inner side of the door trim more centrally than the sealing member.

When the door trim with the sealing member is attached to the inner panel, the sealing members are pressed by the inner panel. The sealing member may collapse when pressed.

If the clip mount bases are arranged close to the flange portion, the sealing member may be caught between the clip and the inner panel when the sealing member collapses toward the clip mount base. If the sealing member is caught between the clip and the inner panel, the sealing performance in an area where the sealing member is caught between the clip and the inner panel decreases. If that occurs, some fixing work is required, that is, the door trim needs to be removed from the inner panel, the seal member needs to be rearranged to the original position, and the door trim needs to be reattached to the inner panel.

To avoid the sealing member from being caught between the sealing member and the inner panel when the sealing member collapses, a considerable distance is required between the sealing member and the clip mount base. Because of such a problem, the clip mount member cannot be arranged close to the sealing member or the peripheral edge of the door trim.

SUMMARY

A vehicle interior part to be attached to a vehicle panel with at least one clip includes a main wall portion, a flange portion, at least one clip mount base, a protrusion, and a sealing member. The main wall portion has a plate-like shape and is to be arranged opposite the vehicle panel. The flange portion projects outward from a peripheral edge of the main wall portion and has an opposed surface that is to be arranged opposite the vehicle panel when the vehicle interior part is attached to the vehicle panel. The clip mount base including a projecting wall and a base. The projecting wall projects from an area of the opposed surface of the flange portion away from a distal end of the flange portion. The base projects at an angle from a distal end of the projecting wall so that the base faces the vehicle panel when the vehicle interior part is attached to the vehicle panel. The base is configured to receive the clip. The protrusion protrudes from an area of the opposed surface between the projecting wall and the distal end of the flange portion. The protrusion has a first height measuring from the opposed surface on a first side closer to the distal end of the flange portion and a second height measuring from the opposed surface on a second side closer to the clip mount base. The first height is greater than the second height. The sealing member is disposed in an area of the opposed surface between the protrusion and the distal end of the flange portion.

DETAILED DESCRIPTION

The technology described herein provides a vehicle interior part having a configuration with which a collapse of a sealing member toward a clip is restricted during attachment of the vehicle interior part to a vehicle panel and a configuration in which a clip mount base is arranged closer to a peripheral edge of the vehicle interior part.

An embodiment will be described with reference to FIGS. 1 to 7.

A door trim 10 includes a trim board 11. The trim board 11 is a board made of synthetic resin or material including synthetic resin and natural fibers, such as kenaf fibers, mixed together.

Figure 1:
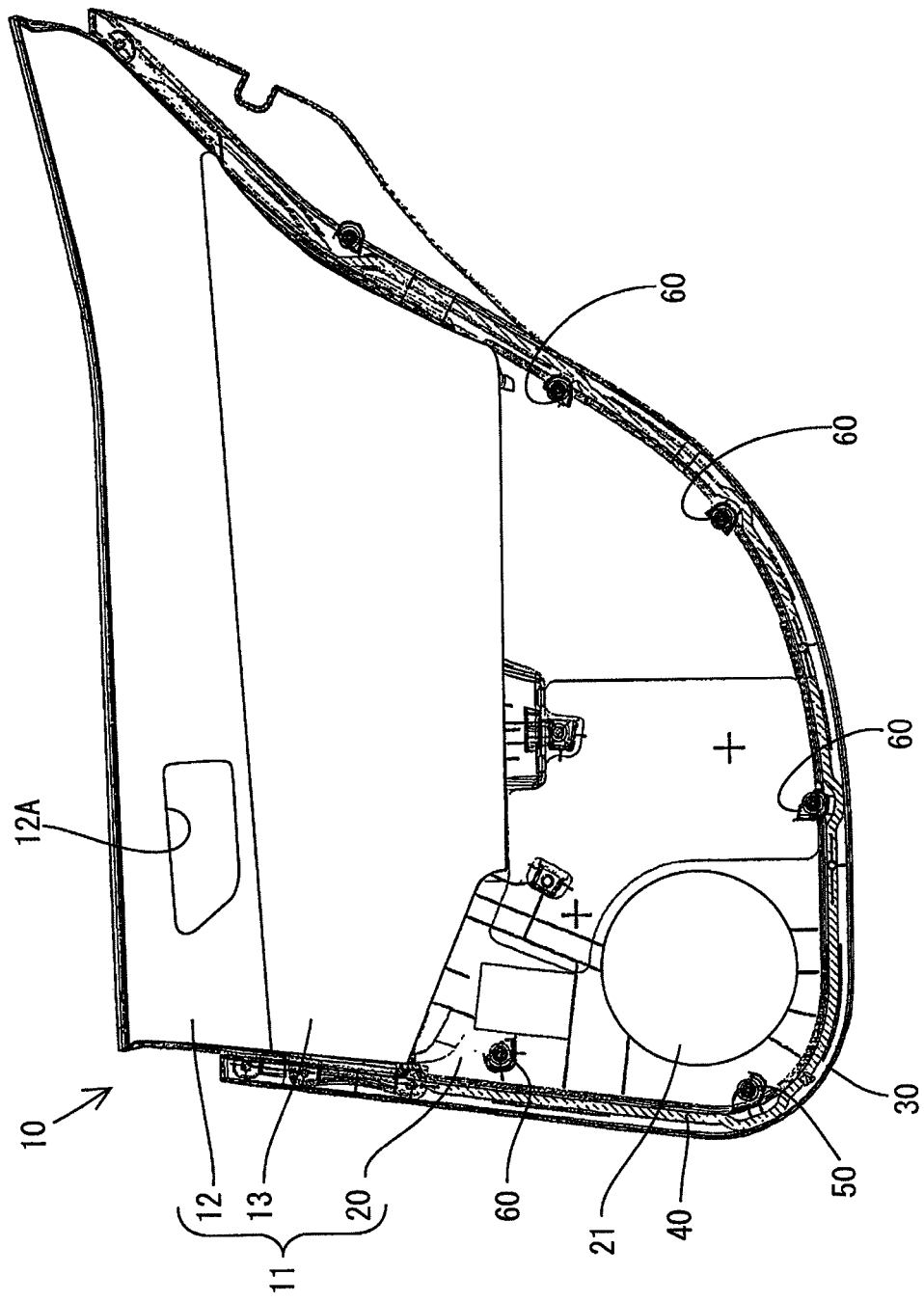
FIG. 1 is a view illustrating a vehicle interior side of a door trim according to an embodiment.
Figure 5:
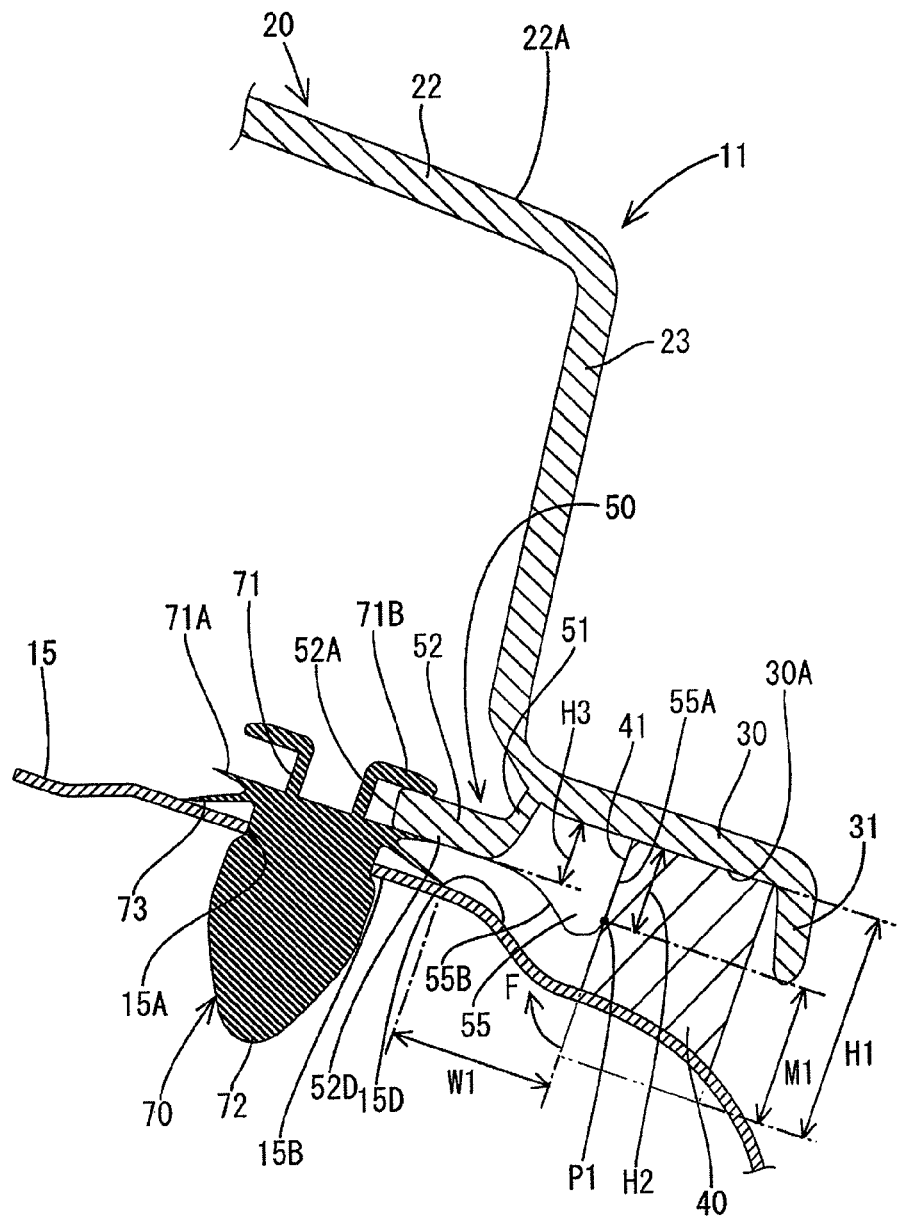
FIG. 5 is a cross-sectional view of the lower board along ling A-A in FIG. 3.

The trim board 11 is to be disposed opposite a door panel 15 (a vehicle panel) as illustrated in FIG. 5. As illustrated in FIG. 1, the trim board 11 includes an upper board 12, a middle board 13, and a lower board 20.

The upper board 12 includes an inside handle holding portion 12A in which an inside handle (not illustrated) is to be arranged. The lower board 20 includes a speaker grille 21. In FIG. 1, some parts arranged on the back surface of the trim board 11 (e.g., a sealing member 40 and first and second clip mount bases 50 and 60 which will be described later) are depicted with solid lines instead of broken lines.

Figure 2:
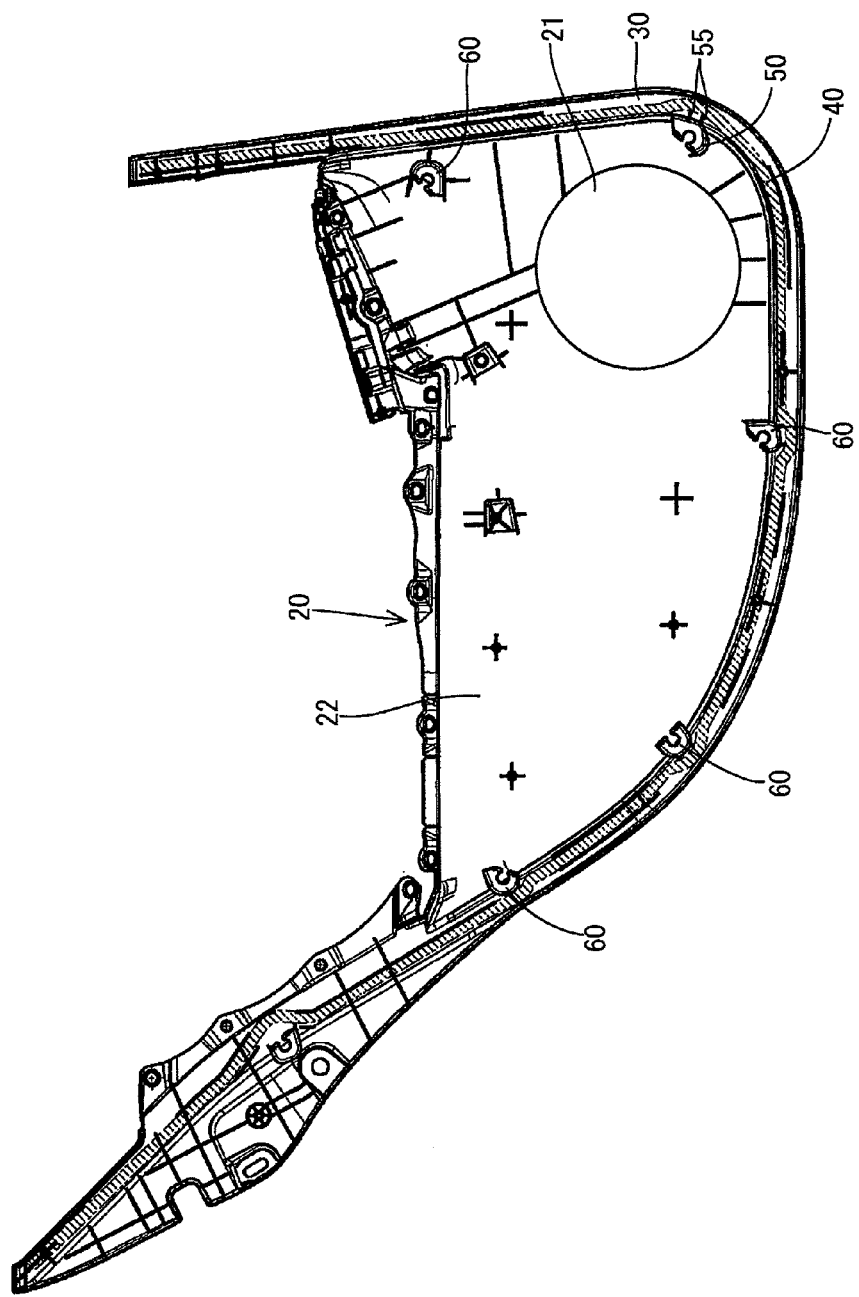
FIG. 2 is a view illustrating a vehicle exterior side of a lower board included in the door trim.

As illustrated in FIGS. 2 and 5, the lower board 20 includes a main wall portion 22 and a peripheral wall portion 23. The first surface of the main wall portion 22 includes a design surface 22A (to be arranged to face an interior of the vehicle).

The peripheral wall portion 23 projects at an angle from a peripheral edge of the main wall portion 22 on the back surface of the main wall portion 22 such that peripheral wall portion 23 projects toward a vehicle exterior side (toward the door panel 15) when the door trim 10 is attached to the door panel 15.

The lower board 20 further includes a flange portion 30 that projects outward from a vehicle exterior-side edge of the peripheral wall portion 23 in the opposite direction to the main wall portion 22. The main wall portion 22 and the flange portion 30 are to be disposed parallel or substantially parallel to the door panel 15 when the door trim 10 is attached to the door panel 15. The flange portion 30 is to be located more exterior (closer to the door panel 15) than the main wall portion 22.

As illustrated in FIG. 2, the flange portion 30 extends along the peripheral edge of the lower board 20 over about the entire length of the peripheral edge of the lower board 20. As illustrated in FIG. 5, the back surface of the flange portion 30 to be arranged on the vehicle-exterior side to face the door panel 15 when the door trim 10 is attached to the door panel 15 is referred to as an opposed surface 30A.

The lower board 20 further includes an extended portion 31 that projects at an angle from the distal end of the flange portion 30 such that the extended portion 31 projects toward the outside of the vehicle when the trim board 10 is attached to the door panel 15.

A sealing member 40 is disposed on the opposed surface 30A. The sealing member 40 is made of flexible and elastic material such as urethane resin form. As illustrated in FIG. 2, the sealing member 40 has an elongated shape and extends over an entire length of the peripheral edge of the lower board 20 (or the flange portion 30).

Figure 7:
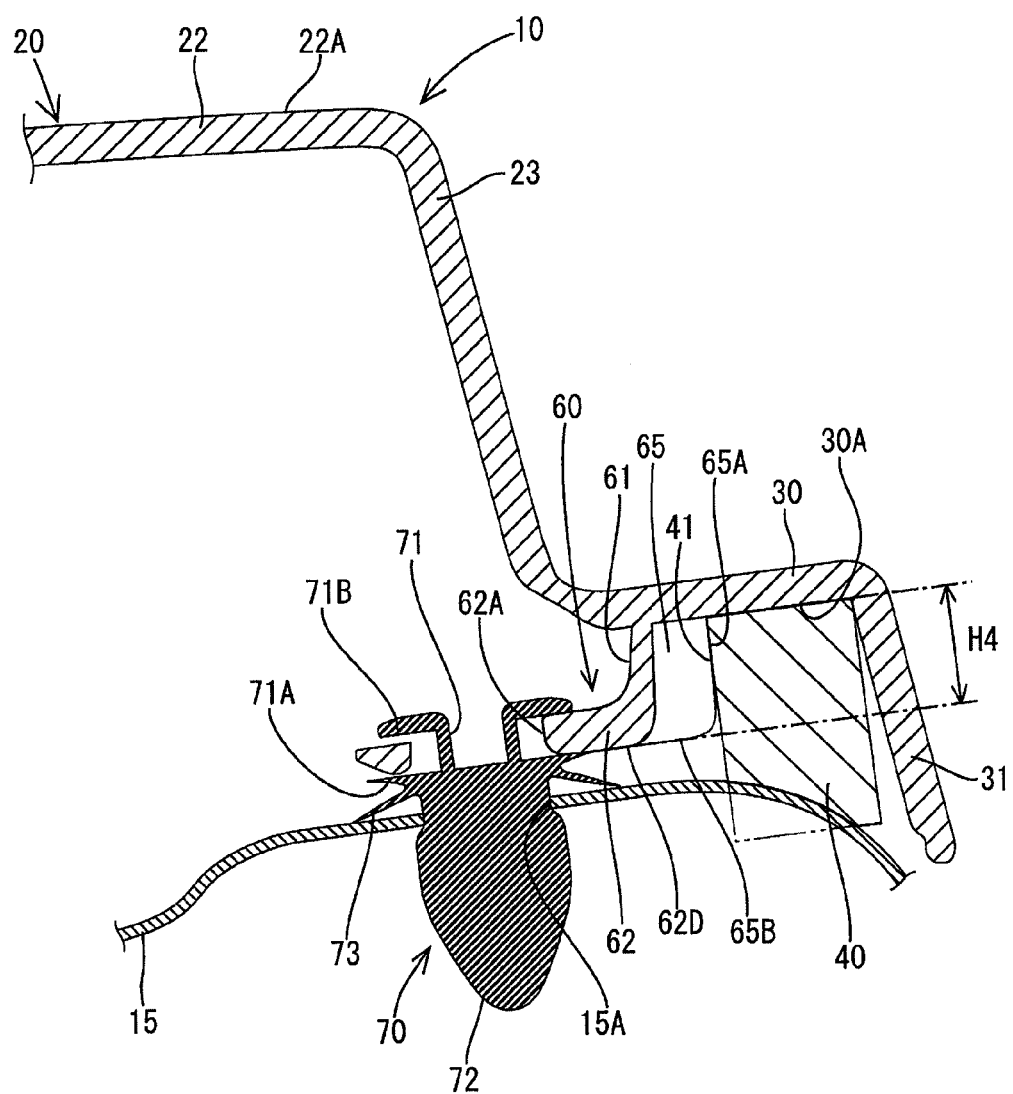
FIG. 7 is a cross-sectional view of the lower board along ling B-B in FIG. 6.

The sealing member 40 is attached to the opposed surface 30A (see FIG. 5) with adhesive or adhesive tape. As illustrated in FIGS. 5 and 7, the sealing member 40 is to be held between the opposed surface 30A and the door panel 15. The thickness of the sealing member 40 in the free state, that is, before being held between the opposed surface 30A and the door panel 15, is greater than a designed distance between the opposed surface 30A and the door panel 15.

With the above configuration, the sealing member 40 is pressed in the thickness direction thereof over the entire length except for some sections when the door trim 10, or the lower board 20, is attached to the door panel 15. While pressed by the door panel 15 when the door trim 10 is attached to the door panel 15, the sealing member 40 establishes intimate contact with the opposed surface 30A and the door panel 15.

Therefore, a gap between the opposed surface 30A and the door panel 15 is sealed by the sealing member 40. With this configuration, abnormal sounds are less likely to occur between the door trim and the door panel 15. Furthermore, outside air or water is less likely to enter via the back surface of the door trim 10.

In FIGS. 5 and 7, the sealing member 40 in the free state is depicted by two-dot chain lines. The sealing member in the free state has a substantially rectangular cross section with a thickness greater than a width.

The lower board 20 includes a first clip mount base 50, second clip mount bases 60, first ribs 55, and second ribs 65 on the opposed surface 30A of the flange portion 30. The first clip mount base 50 is located closer to the main wall portion 22 (inner side of the door trim 10) than the sealing member 40. The first clip mount base 50 is located between the speaker grille 21 of the lower board 20 and the sealing member 40.

The first clip mount base 50 is formed integrally with the flange portion 30. As illustrated in FIG. 5, the first clip mount base 50 includes a projecting wall 51 and a base 52. The projecting wall 51 projects at an angle from the opposed surface 30A of the flange portion 30. More specifically, the projecting wall 51 projects at an angle from an area of the opposed surface 30A of the flange portion 30 located away from the distal end of the flange portion 30. The projecting wall 51 is configured to project toward the door panel 15 when the door trim 10 is attached to the door panel 15. The base 52 extends from a distal end of the projecting wall 51 in an opposite direction from the sealing member 40.

Figure 4:
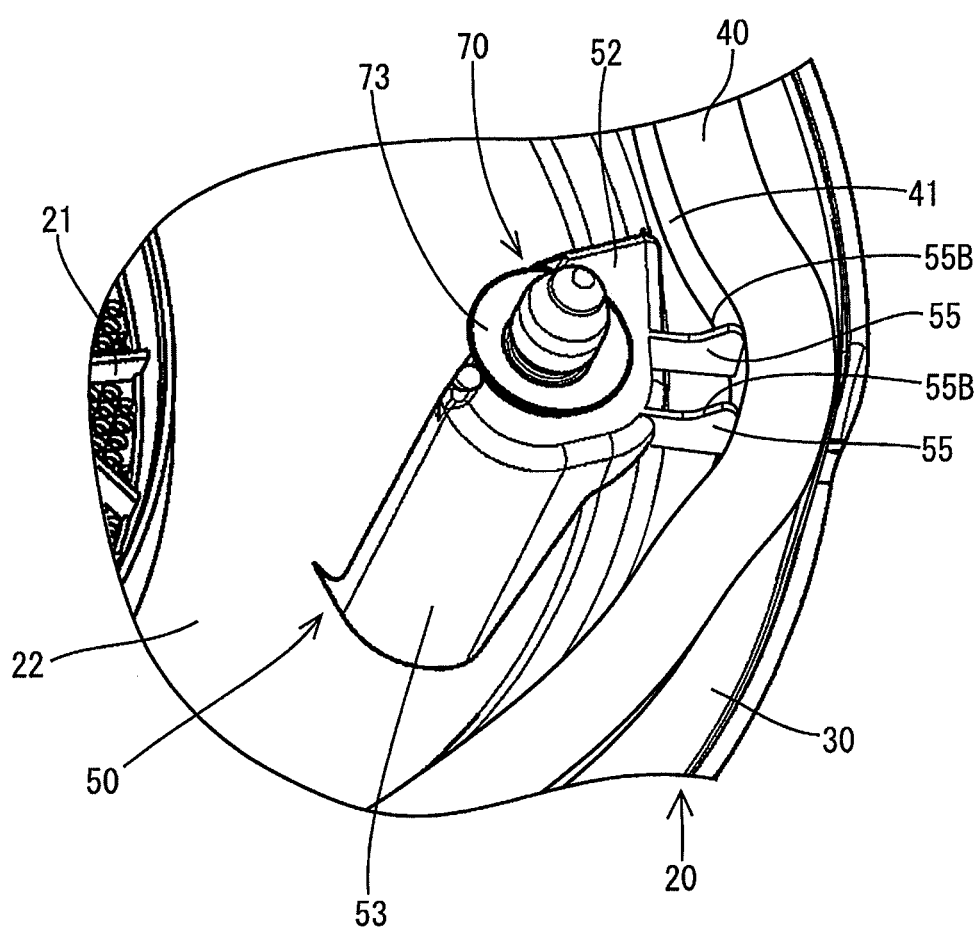
FIG. 4 is a perspective view illustrating the first clip mount base.

As illustrated in FIG. 4, the first clip mount base 50 includes a leg portion 53 that projects from the back surface of the main wall portion 22. A portion of the base 52 is coupled to the back surface of the main wall portion 22 via the leg portion 53.

Figure 3:
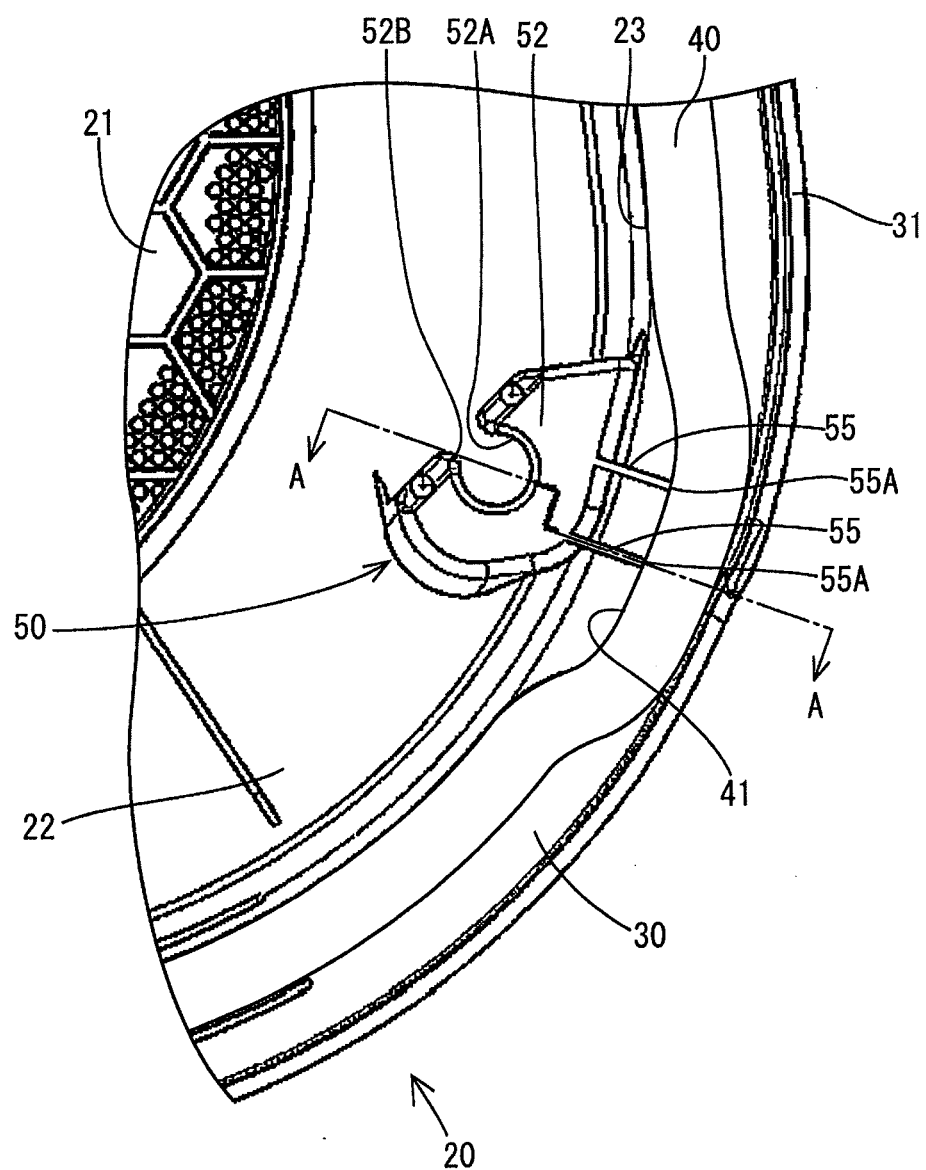
FIG. 3 is a magnified view illustrating a portion of the lower board including a first clip mount base.

As illustrated in FIG. 5, the base 52 extends from the distal end of the projecting wall such that the base 52 is to be parallel to a surface of the door panel 15 opposite the door trim 10 when the door trim 10 is attached to the door panel 15. Namely, the base 52 is to be disposed opposite the door panel 15. As illustrated in FIG. 3, the base 52 includes a holding hole 52A for receiving the clip 70. The base 52 further includes an insertion opening 52B through which the clip 70 (more specifically, a shaft portion 71 of the clip 70, which will be described later) is inserted into the holding hole 52A. The insertion opening 52B is formed by cutting out a portion of an edge of the base 52 at an edge of holding hole 52A.

The clip 70 is made of elastically deformable material. As illustrated in FIG. 5, the clip 70 includes the shaft portion 71 and an insert portion 72. The shaft portion 71 having a round column shape is placed in the holding hole 52A. The insert portion 72 is to be inserted in the mounting hole 15A that is a through hole in the door panel 15.

The shaft portion 71 may be configured to be captured within the holding hole 52A. The clip 70 includes a first holding piece 71A and a second holding piece 71B projecting from the respective ends of the shaft portion 71. The first holding piece 71A and the second holding piece 71B hold a portion of the base 52 around the holding hole 52A therebetween, that is, holding the base 52 from the front side and from the back side (in the interior side and the exterior side).

Each of the first holding piece 71A and the second holding piece 71B has an annular shape. When the shaft portion 71 is captured within the holding hole 52A, the first holding piece 71A and the second holding piece 71B are held against the front surface and the back surface of the base 52 around the holding hole 52A, respectively. With this configuration, the clip 70 is held in a position perpendicular to the projecting direction of the base 52.

The insert portion 72 has a taper shape that decreases in diameter toward the tip thereof. The insert portion 72 is to be inserted into the mounting hole 15A of the door panel 15 while the insert portion 72 is shrunk to decrease in diameter. When the insert portion 72 passes all the way through the mounting hole 15A, the insert portion 72 restores its original shape. When the insert portion 72 restores its original shape, the insert portion 72 is held to the edge of the mounting hole 15A from the exterior side.

With the clips 70 mounted to both first clip mount bases 50 and door panel 15, the door trim 10 is attached to the door panel 15 with the clips 70. Each clip 70 includes a cover portion 73 that covers a gap between the edge of the mounting hole 15A and the insert portion 72.

The cover portion 73 projects from the first holding piece 71A and spreads toward the insert portion 72 such that a peripheral edge of the cover portion 73 is placed against the door panel 15 when the door trim 10 is attached to the door panel 15. With this configuration, the cover portion 73 covers the gap between the edge of the mounting hole 15A of the door panel 15 and the insert portion 72.

As illustrated in FIG. 5, the clips 70 are mounted to bulging portions 15B of the door panel 15. The bulging portions 15B are portions of the door panel 15 which bulge toward the interior side such that the bulging portions 15 are to be closer to the door trim 10 when the door trim 10 is attached to the door panel 15. The mounting holes 15 are through holes in the bulging portions 15B.

The bulging portions 15B are arranged opposite and parallel to the bases 52 when the door trim 10 is attached to the door panel 15. With this configuration, an insertion direction of each clip 70 is aligned with a direction in which the corresponding mounting hole 15A runs through. Therefore, the clip 70 can be easily inserted into the mounting hole 15A.

The first ribs 55 project from an area of the opposed surface 30A between the projecting wall 51 and the distal end of the flange portion 30. The first ribs 55 are coupled to the first clip mount base 50. The sealing member 40 is disposed in an area of the opposed surface 30A between the first ribs 55 and the distal end of the flange portion 30.

Each first rib 55 (a protrusion) protrudes from an area of the opposed surface 30A of the flange portion 30 between the first clip mount base 50 and the sealing member 40. More specifically, the first rib 55 protrudes from an area of the opposed surface 30A of the flange portion 30 between the projecting wall 51 and the distal end of the flange portion 30. The first rib 55 is configured to project toward the door panel 15 when the door trim 10 is attached to the door panel 15. As illustrated in FIGS. 3 and 4, two first ribs 55 are arranged apart from each other in the extending direction of the sealing member 40.

As illustrated in FIGS. 4 and 5, a sidewall of each first rib 55 closer to the base 52 is coupled to the projecting wall 51 and the base 52 over an entire length thereof. The first rib 55 has a sidewall 55A that is in contact with an inner side surface 41 of the sealing member 40 located inner of the lower board 20 than the other side surface. As illustrated in FIG. 3, portions of the sealing member 40 in areas where the first ribs 55 are disposed are diverted around the first ribs 55.

As illustrated in FIG. 5, the height of the sidewall of each first rib 55 closer to the sealing member 40 (on a side closer to the distal end of the flange portion 30, a first side) measuring from the opposed surface 30A of the flange portion 30 is referred to as a first height H2. The height of a portion of the first rib 55 closer to the first clip mount base 50 (on a second side) and measuring from the opposed surface 30A of the flange portion 30 is referred to as a second height H3. The first height H2 is greater than the second height H3.

More specifically, each first rib 55 has a shape that gradually increases in height, which measures from the opposed surface 30A, from the base 52 side to the sealing member 40 side. The first rib 55 has a curved distal end surface 55B. The distal end surface 55B is to be located closer to the door panel 15 when the door trim 10 is attached to the door panel 15. The distal end surface 55B is curved along a shape of the surface of the corresponding bulging portion 15B of the door panel 15. Namely, the distal end surface 55B and a corresponding area of an opposed surface 15D opposite the distal end surface 55B of the door panel 15 are parallel to each other.

The distal end surface 55B continues from a seating surface 52D of the base 52 (an exterior surface of the base 52 on the vehicle-exterior side) at the end on the first clip mount base 50 side. The distal end surface 55B curves away from the opposed surface 30A of the flange portion 30 such that a distance from the opposed surface 30A increases from the first clip mount base 50 side toward the sealing member 40 side. The distal end surface 55B curves toward the door panel 15 in a condition that the door trim 10 is attached to the door panel 15. Namely, the first height H2 of the first rib 55 at the sealing member 40 side is greater than the base height H3 of the seating surface 52D of the base 52 of the first clip mount base 50.

A dimension of the sealing member 40 in the free state measuring in a direction in which the first rib 55 protrudes (i.e., the thickness of the sealing member 40) is defined as a sealing member height H1 (see FIG. 5). A dimension of the sidewall of the first rib 55 at the end on the sealing member 40 side measuring from the opposed surface 30A is referred to as a first height H2 (see FIG. 5). The sealing member height H1 is defined greater than the first height H2.

A distance between the sealing member 40 and the clip 70 measuring in the direction in which the first rib 55 and the clip 70 (or the first clip mount base 50) are arranged is referred to as a distance W1. The first height H2 is defined as follows.

$$H1-H2<W1$$

As illustrated in FIGS. 2 and 7, the lower board 20 includes the second clip mount bases 60 that have different configuration from the first clip mount bases 50. The second clip mount bases 60 are arranged along the peripheral edge of the lower board 20. Specifically, the first clip mount base 50 is arranged close to a corner of the lower board 20 (or the speaker grille 21) and the second clip mount bases 60 are arranged in other areas of the lower board 20.

As illustrated in FIG. 7, each second clip mount base 60 includes a projecting wall 61 and a base 62. The projecting wall 61 projects at an angle from the opposed surface 30A. The projecting wall 61 is configured to project toward the door panel 15 when the door trim 10 is attached to the door panel 15. The base 62 extends from the distal end of the projecting wall 61 in the opposite direction to the sealing member 40. The second clip mount base 60 is formed integrally with the flange portion 30.

Figure 6:
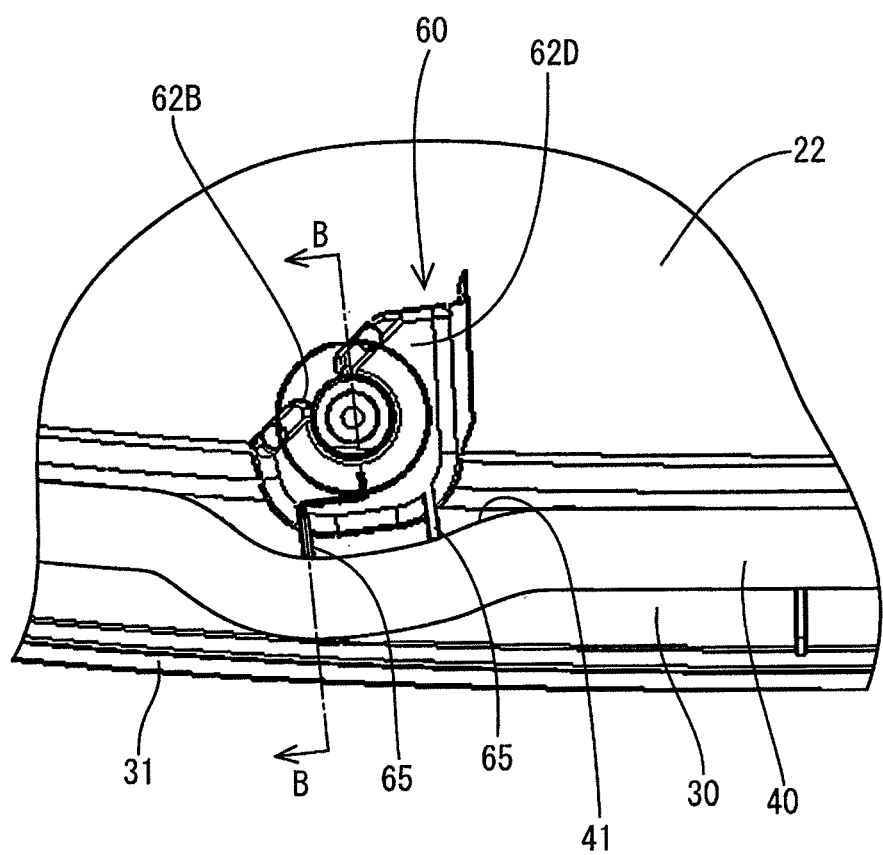
FIG. 6 is a view illustrating a second clip mount base included in the lower board in FIG. 2.

The base 62 extends from the distal end of the projecting wall 61 such that the base 62 is to be parallel to a surface of the door panel 15 opposite the door trim 10 when the door trim 10 is attached to the door panel 15. As illustrated in FIG. 6, the base 62 has an insertion opening 62B through which the clip 70 is inserted into a holding hole 62A. The insertion opening 62B is formed by cutting out a portion of the base 62 at the edge of a holding hole 62A.

As illustrated in FIG. 7, each second rib 65 is configured to project from the opposed surface 30A toward the door panel 15 when the door trim 10 is attached to the door panel 15. As illustrated in FIG. 6, two second ribs 65 are arranged apart from each other in the extending direction of the sealing member 40 for each second clip mount base 60.

As illustrated in FIG. 7, a sidewall of each second rib 65 closer to the base 62 is coupled to the projecting wall 61 and the base 62 over an entire length thereof. The second rib 65 has a sidewall 65A that is in contact with the inner side surface 41 of the sealing member 40 located on an inner side of the lower board 20 than the other side surface.

The distal end surface 65B of the second rib 65 (on the door panel 15 side when the door trim 10 is attached to the door panel 15) continues from a seating surface 62D of the base 62. The second rib 65 has a constant height measuring from the opposed surface 30A. Namely, the distal end surface 65B of the second rib 65 is flat.

In comparison to the configuration of the first clip mount base 50, a base height H4 of the base 62 of the second clip mount base 60 (see FIG. 7) is greater than the base height H3 of the base 52 of the first clip mount base 50 (see FIG. 5). The height of the base of the clip mount base corresponds to a height of the surface measuring from the opposed surface 30A to the base in the direction perpendicular to the opposed surface 30A (in the right-left direction of the vehicle).

The base height H3 of the base 52 of the first clip mount base 50 is the smallest among the base heights H3 and H4 of the bases 52 and 62 of the first and the second clip mount bases 50 and 60. The first ribs 55 are coupled to the first clip mount base 50, the height of the base of which is the smallest among the clip mount bases 50 and 60.

Next, effects achieved by this embodiment will be described. The door trim 10, or the trim board 11, is attached to the door panel 15 with the sealing member 40 attached to the opposed surface 30A of the flange portion 30. In this attachment process, the sealing member 40 in the free state is pressed by the door panel 15 from the exterior side. The sealing member 40 may collapse toward the first clip mount bases 50 when pressed. In FIG. 5, expected movement of the sealing member 40 when the sealing member 40 collapses toward the first clip mount base 50 is indicated by arrow F.

The first ribs 55 are arranged between the sealing member 40 and the first clip mount bases 50. With this configuration, the sealing member 40 is supported by the sidewalls 55A of the first ribs 55 even when the sealing member in the free state starts collapsing during the attachment of the trim board 11 to the door panel 15. Therefore, the sealing member 40 is less likely to collapse. The first clip mount bases 50 can be closely arranged to the sealing member 40. Namely, the first clip mount base 50 can be closely arranged to the peripheral edge of the door trim 10.

The first height of each first rib 55, which restricts the collapse of the sealing member 40 is higher than the second height thereof. Therefore, the sealing member 40 is more properly received by the first ribs 55. The second height of each first ribs 55 is set relatively small. With this configuration, a larger amount of space can be provided between the first ribs 55 and the door panel 15. Therefore, the first ribs 55 are less likely to collide against the door panel 15.

Namely, each first rib 55 includes a receiving portion for receiving the sealing member 40 (the sidewall closer to the sealing member 40) with a sufficient height and portions other than the receiving portion with a height as small as possible. With this configuration, the first ribs 55 are less likely to collide against the door panel 15.

To properly receive the sealing member 40, it is preferable that the height of the first ribs 55 is large. However, if the first ribs 55 are too high, the first ribs 55 may collide against the door panel 15.

Each first rib 55 in this embodiment has a shape that gradually increases in height from the base 52 side to the sealing member 40 side. The distal end surface 55B of each first rib 55 is curved along the shape of bulged portion 15B of the door panel 15. With this configuration, the first ribs 55 having considerably large height are less likely to collide against the door panel 15.

The flange portion 30 and the opposed surface 30A extend along the peripheral edge of the lower board 20. The first and the second clip mount bases 50 and 60 are arranged on the surface of the lower board 20 on the door panel 15 side along the peripheral edge of the lower board 20. The first ribs 55 are coupled to the first clip mount base 50 having the dimension measuring from the opposed surface 30A to the seating surface 52D of the base is smaller than that of the second clip mount bases 60.

In general, surfaces of door panels are not flat and may be wavy. An area of the door panel 15 including the bulged portion 15B illustrated in FIG. 5 is an example of wavy surfaces of the door panels. The heights of the first and the second clip mount bases 50 and 60 need to be defined according to the levels of the surface of the door panel 15.

Specifically, the height of the first clip mount base 50 opposite the bulged portion 15B of the door panel 15 needs to be smaller than the second clip mount bases 60. When the door trim 10 is attached to the door panel 15, the area of the opposed surface 30A of the lower board 20 opposite the bulged portion 15B is located close to the door panel 15. Therefore, the height of the base 52 of the first clip mount base 50 from the opposed surface 30A needs to be defined smaller so that the first clip mount base 50 is less likely to collide against the door panel 15, more specifically, the bulged portion 15B.

The first clip mount base 50 having the smallest height of the base among the first and the second clip mount bases 50 and 60 is arranged in the area of the opposed surface 30A of the lower board 20 opposite the bulged portion 15B. The first clip mount base 50 is located closer to the door panel 15. Namely, an area of the door panel 15 opposite the first clip mount base 50 is closer to the lower board 20 than other portions of the door panel 15. In such an area, consideration is required for reducing chances that components of the lower board 20 collide against the door panel 15. This embodiment includes the first ribs 55 for the first clip mount base 50 arranged in such an area. As described earlier, the first ribs 55 are configured such that the first ribs 55 are less likely to collide against the door panel 15. Therefore, even the first ribs 55 are arranged in an area close to the door panel 15, less consideration is required for reducing chances that the first ribs 55 collide against the door panel 15 and there is less limitation in design.

This embodiment includes the second ribs 65 coupled to the second clip mount bases 60 for restricting the sealing member 40 from collapsing. As illustrated in FIG. 7, the height of each second rib 65 with respect to the opposed surface 30A is set equal to the height of the base 62 of the second clip mount base 60.

As illustrated in FIGS. 5 and 7, the distance between the opposed surface 30A and the door panel 15 in the area where the first clip mount base 50 is arranged is smaller than in the area where the second clip mount base 60 is arranged. In the area where the first clip mount base 50 is arranged, the door panel 15 and the lower board 20 are closer to each other than in the area where the second clip mount base 60 is arranged. To reduce chances that the first clip mount base 50 collides against the door panel 15, the height of the seating surface 52D from the opposed surface 30A is smaller than that of the seating surface 62D.

If the projection height of each first rib 55 is defined equal to a height of the seating surface 52D (corresponding to the base height H3 in FIG. 5), the height of the first rib 55 is not sufficiently large for properly receiving the sealing member 40 to restrict the sealing member from collapsing. Each first rib 55 has the height that gradually increases toward the sealing member 40, that is, the first rib 55 has the adequate projection height at the end on the sealing member 40 side (with which the sealing member 40 is received).

The height H1 of the sealing member 40 is defined greater than the first height H2 of the first ribs 55 on the sealing member 40 side. The first height H2 on the sealing member 40 side is defined such that the value calculated by subtracting the first height H2 from the sealing member height H1 is smaller than the distance W1 from the sealing member 40 to the clip 70 measuring in the direction in which the first rib 55 and the clip 70 are arranged.

If the sealing member height H1 is defined greater than the first height H2 and the sealing member 40 collapsing toward the clip 70 is received by the first ribs 55, a portion of the sealing member 40 (a distal end portion of the sealing member 40, a portion indicated by symbol M1 in FIG. 5) may deform toward the clip 70 and lean over an edge P1 of the first rib 55. For example, the sealing member 40 curves at the edge P1 of the first rib 55. In this embodiment, the value calculated by subtracting the first height H2 from the sealing member height H1 is smaller than the distance W1 from the sealing member 40 to the clip 70.

The value calculated by subtracting the first height H2 from the sealing member height H1 corresponds to a dimension of the portion of the sealing member 40 which may lean over the first rib 55 (the portion indicated by symbol M1 in FIG. 5). By setting the dimension smaller than the distance W1 from the sealing member 40 to the clip 70, the sealing member 40 is less likely to reach the clip 70 even when a portion of the sealing member 40 deforms toward the clip 70 and leans over the first rib 55.

This embodiment includes two first ribs 55 and several second ribs 65. During attachment of the sealing member 40 to the opposed surface 30A, the sealing member 40 can be easily positioned by holding the side surface 41 of the sealing member 40 against the first ribs 55 and the second ribs 65.

The first clip mount base 50 to which the first ribs 55 are coupled is arranged closer to the speaker grille 21 than the second clip mount bases 60. With this configuration, the sealing member 40 is further less likely to collapse toward the first clip mount base 50 in an area near the speaker grille 21 where a speaker will be disposed. Therefore, the sealing capability of the sealing member 40 is less likely to decrease in the area near the speaker grille 21.

The first ribs 55 are continuously coupled to the opposed surface 30A and the base 52. With this configuration, the base 52 is coupled to the opposed surface 30A (or the flange portion 30) via the first ribs 55 and thus the strength of the base 52 increases.

Other Embodiments

The technology described herein is not limited to the above embodiments described in the above description and the drawings. The technology described herein may include the following embodiments.

(1) The technology described herein can be applied to vehicle interior parts other than a door trim. Examples of such vehicle interior parts include pillar garnishes and other vehicle interior parts that are to be attached to vehicle panels and gaps between the vehicle panels and the vehicle interior parts are to be sealed with sealing members.

(2) The material and the shape of the sealing member 40 are not limited to those in the above embodiments.

(3) The configuration of the first ribs 55 is not limited to the rib configuration. Each first rib 55 may have a pillar configuration.

(4) The sealing member 40 may be disposed such that the sealing member 40 is not in contact with the first ribs 55. For example, the sealing member 40 may be disposed with a gap between the sealing member 40 and the sidewalls 55A of the first ribs 55.

(5) The trim board 11 may include a single board instead of multiple boards (the upper board 12, the middle board 13, and the lower board 20).

(6) Each of the first clip mount base 50 and the second clip mount bases 60 may be configured such that a portion thereof is coupled to the opposed surface 30A. The first clip mount base 50 and the second clip mount bases 60 may be coupled to the opposed surface 30A but not to the main wall portion 22.

The invention claimed is:

1. A vehicle interior part to be attached to a vehicle panel with at least one clip, comprising:
    a main wall portion having a plate-like shape and to be arranged opposite the vehicle panel;
    a flange portion projecting outward from a peripheral edge of the main wall portion and having an opposed surface that is to be arranged opposite the vehicle panel when the vehicle interior part is attached to the vehicle panel;
    at least one clip mount base including:
        a projecting wall projecting from an area of the opposed surface of the flange portion away from a distal end of the flange portion; and
        a base projecting at an angle from a distal end of the projecting wall so that the base faces the vehicle panel when the vehicle interior part is attached to the vehicle panel, the base being configured to receive the at least one clip;
    a first protrusion
        protruding from an area of the opposed surface between the projecting wall and the distal end of the flange portion, and
        having a first height measuring from the opposed surface on a first side closer to the distal end of the flange portion and a second height measuring from the opposed surface on a second side closer to the clip mount base,
        wherein the first height is greater than the second height; and
    a sealing member disposed in an area of the opposed surface between the first protrusion and the distal end of the flange portion.

2. The vehicle interior part according to claim 1, wherein
    the sealing member has a height in a free state measuring in the same direction in which the first height of the first protrusion measures greater than the first height of the first protrusion, and
    the first height of the first protrusion is defined such that a value calculated by subtracting the first height from the height of the sealing member is smaller than a distance between the sealing member and the clip measuring in a direction in which the protrusion and the clip mount base are arranged.

3. The vehicle interior part according to claim 2, wherein
    the sealing member is made of flexible and elastic material, and
    the height of the sealing member in the free state is greater than a designed distance between the back surface of the flange portion and the vehicle panel to establish intimate contact with the vehicle panel and the back surface of the flange portion while pressed by the vehicle panel when the vehicle interior part is attached to the vehicle panel.

4. The vehicle interior part according to claim 1, wherein
    the first protrusion has a first sidewall with the first height on the first side and a second sidewall with the second height on the second side, and
    the second sidewall is coupled to the projecting wall of the at least one clip mount base over an entire length of the second sidewall.

5. The vehicle interior part according to claim 4, wherein the sealing member is in contact with the first sidewall of the first protrusion.

6. The vehicle interior part according to claim 1, wherein
the flange portion and the opposed surface of the flange portion extend along the peripheral edge of the main wall portion,
the at least one clip mount base includes a first clip mount base and a second clip mount base arranged along the peripheral edge of the main wall portion,
the first clip mount base has a dimension measuring from the opposed surface to the base smaller than the second clip mount base, and
the first protrusion is arranged between the first clip mount base and the sealing member.

7. The vehicle interior part according to claim 6, wherein
the first protrusion is coupled to the first clip mount base and has a curved distal end surface that continues from a surface of the base of the first clip mount base, and
the curved distal end surface is curved away from the back surface of the flange portion.

8. The vehicle interior part according to claim 6, further comprising a second protrusion disposed between the second clip mount base and the distal end of the flange portion.

9. The vehicle interior part according to claim 8, wherein the second protrusion is coupled to the second clip mount base and has a flat distal end surface that continues from a surface of the base of the second clip mount base.

10. The vehicle interior part according to claim 8, wherein the sealing member is in contact with the first and second protrusions.

11. A vehicle interior assembly comprising:
a trim board configured to be attached to a vehicle panel with clips, the trim board including:
  a wall portion having a first surface that includes a design surface to be arranged to face an interior of the vehicle and a second surface that is a back surface to be arranged to face the vehicle panel;
  a flange portion projecting outward from a peripheral edge of the wall portion;
  clip mount bases including a first clip mount base and a second clip mount base, each protruding from a back surface of the flange portion, the each clip mount base including:
    a projecting wall projecting at an angle from an area of the back surface of the flange portion located away from a distal end of the flange portion; and
    a base extending at an angle from a distal end of the projecting wall and parallel to the back surface of the flange portion, and having a holding hole for receiving corresponding one of the clips;
  a first protrusion protruding from an area of the back surface of the flange portion between the projecting wall and the distal end of the flange portion, the first protrusion being in a shape with a dimension measuring in a direction perpendicular to the back surface of the flange portion greater at a first side thereof closer to the distal end of the flange portion than at a second side thereof closer to the clip mount base;
  a sealing member disposed in an area of the back surface of the flange portion between the first protrusion and the distal end of the flange portion; and
clips, each including:
  a shaft having a round column shape and being placed in the holding hole of the base of the corresponding clip mount base;
  a first holding piece and a second holding piece projecting from the shaft and holding a portion of the base around the holding hole therebetween;
  an insert portion extending from the first holding piece in an axial direction of the shaft, having a taper shape that decreases in diameter toward a tip thereof, and having resilience so that the insert portion decreases in diameter when passing through a mounting hole of the vehicle panel and restores an original shape thereof when passes all the way through the mounting hole of the vehicle panel; and
  a cover portion projecting from the first holding piece and spreading toward the insert portion such that a peripheral edge thereof is placed against the vehicle panel when the door trim is attached to the vehicle panel and the cover portion covers a gap between an edge of the mounting hole of the vehicle panel and the insert portion.

12. The vehicle interior assembly according to claim 11, wherein the first protrusion has a curved distal end surface that continues from a surface of the base of the first clip mount base and curves away from the back surface of the flange portion.

13. The vehicle interior assembly according to claim 11, wherein
the first clip mount base has a dimension measuring from the back surface of the flange portion to the base smaller than the second clip mount bases, and
the first protrusion is coupled to the projecting wall of the first clip mount base.

14. The vehicle interior assembly according to claim 13, wherein
the trim board further includes a second protrusion protruding from an area of the back surface of the flange portion between the projecting wall of the second clip mount base and the distal end of the flange portion,
the second protrusion has a flat surface that continues from a surface of the base of the second clip mount bases, and
the second protrusion is coupled to the projecting wall of the second clip mount base.

15. The vehicle interior assembly according to claim 13, wherein
the sealing member is made of flexible and elastic material and has a height measuring in free state greater than a designed distance between the back surface of the flange portion and the vehicle panel to establish intimate contact with the vehicle panel while pressed by the vehicle panel when the trim board is attached to the vehicle panel, and
the first protrusion has a sidewall having a height greater than a height of a portion of the first protrusion closer to the first clip mount base and measuring from the back surface of the flange portion to the base and in contact with the sealing member.

16. The vehicle interior assembly according to claim 15, wherein the sidewall is configured such that a value calculated by subtracting a height of the sidewall from the height of the sealing member is smaller than a distance between the sealing member and the peripheral edge of the cover portion of the clip in the first clip mount base.

* * * * *